US010705361B2

United States Patent
Song et al.

(10) Patent No.: US 10,705,361 B2
(45) Date of Patent: Jul. 7, 2020

(54) LIQUID CRYSTAL DISPLAY DEVICE

(71) Applicant: LG Display Co., Ltd., Seoul (KR)

(72) Inventors: Min-Cheol Song, Gyeongsangbuk-do (KR); Dongyoung Suh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 328 days.

(21) Appl. No.: 15/378,862

(22) Filed: Dec. 14, 2016

(65) Prior Publication Data

US 2017/0168344 A1 Jun. 15, 2017

(30) Foreign Application Priority Data

Dec. 15, 2015 (KR) .................. 10-2015-0179046

(51) Int. Cl.
*G02F 1/1333* (2006.01)
*F21V 8/00* (2006.01)

(52) U.S. Cl.
CPC ...... *G02F 1/133308* (2013.01); *G02B 6/0088* (2013.01); *G02F 2001/133314* (2013.01); *G02F 2001/133322* (2013.01)

(58) Field of Classification Search
CPC ..... G02F 1/133308; G02F 2001/13314; G02F 2001/133314; G02F 2001/133322; G02B 6/0088
See application file for complete search history.

(56) References Cited

U.S. PATENT DOCUMENTS

| 2010/0134725 | A1* | 6/2010 | Yoon | ............... G02F 1/1333 349/96 |
| 2015/0131023 | A1* | 5/2015 | Kim | ............ G02F 1/133308 349/58 |
| 2016/0231496 | A1* | 8/2016 | Song | ............... G02B 6/0031 |
| 2017/0090113 | A1* | 3/2017 | Yuki | ............... G02B 6/0021 |

FOREIGN PATENT DOCUMENTS

KR 10-2008-0059719 A 7/2008

\* cited by examiner

*Primary Examiner* — Nathanael R Briggs
*Assistant Examiner* — William D Peterson
(74) *Attorney, Agent, or Firm* — Dentons US LLP

(57) ABSTRACT

Provided herewith is a display device comprising: a first display unit having an alignment mark; and a bottom plate disposed under the first display unit and comprising an alignment hole corresponding to the alignment mark, wherein the bottom plate comprises: a base portion having a first area and a second area surrounding the first area, the alignment hole being located in the second area; a side wall portion along a periphery of the base portion; and a protruding portion protruding from the base portion to surround the alignment hole. Accordingly, in the liquid crystal display device having a narrow bezel, the protruding portion made of a rigid material surrounds the alignment hole formed in the bottom plate, such that alignment holes can be formed uniformly. As a result, it is possible to suppress misalignment from possibly occurring during the process of bonding the liquid crystal display panel with the bottom plate.

19 Claims, 8 Drawing Sheets

LIQUID CRYSTAL DISPLAY DEVICE

CROSS-REFERENCE TO RELATED APPLICATIONS

This application claims priority from Korean Patent Application No. 10-2015-0179046 filed on Dec. 15, 2015, the disclosure of which is incorporated by reference as is fully set forth herein.

BACKGROUND

Technical Field

The present disclosure relates to a liquid crystal display device, including particularly a liquid crystal display device capable of minimizing misalignment between a bottom plate and a liquid crystal display panel for implementing a narrow bezel.

Description of the Related Art

Liquid crystal display (LCD) devices are one of the most prevalent display devices. A liquid crystal display adjusts the amount of transmitted light by applying a voltage across the electrodes to re-orient liquid crystal molecules in the liquid crystal layer.

A typical liquid crystal display device includes a liquid crystal display panel displaying images and a backlight unit providing light to the liquid crystal display panel. In addition, a liquid crystal display device further includes a bottom plate accommodating the liquid crystal display panel and the backlight unit. Typically, the bottom plate has a box shape with an open top. The backlight unit includes elements, such as a light source, a light guide plate, a reflective plate, and a plurality of optical sheets, and the backlight unit is disposed in the bottom plate. The liquid crystal display panel is disposed on the backlight unit, such that the backlight unit and the liquid crystal display panel are surrounded by side walls of the bottom plate. Accordingly, when viewed from the top of the liquid crystal display panel, a part of the bottom plate, particularly the side walls may be seen. To avoid the bottom plate from being seen by viewers, a shielding layer is disposed on a cover glass on the liquid crystal display panel. The shielding layer has at least a width sufficient to hide the part of the bottom plate which is not covered by the liquid crystal display panel.

Recently, there is an increasing demand for liquid crystal display devices that have better designs and aesthetics, in addition to functionality, such as image quality, response speed and contrast ratio.

Accordingly, the demand for liquid crystal display devices having a narrow bezel (minimal bezel or zero bezel) is increasing. Such devices are light and thin and have as large a display area and as a small non-display area, i.e., bezel area, as possible.

However, when the shielding layer is disposed on the cover glass to shield the side walls of the bottom plate from viewers as described above, the shielding layer should be at least wide enough to hide the side walls. Thus, there is a limit to implementing a desirable narrow bezel structure.

There are several ways to implement a narrow bezel. For example, one option would be to equalize the area of the bottom plate and the area of the lower surface of the liquid crystal display panel. Specifically, the bottom plate accommodates the backlight unit, and the liquid crystal display panel is disposed on the side walls of the bottom plate, to minimize the width of the shielding layer on the cover glass. That is, when viewed from the top or front of the liquid crystal display panel, the liquid crystal display panel is disposed on the side walls of the bottom plate such that the bottom plate is hidden by the liquid crystal display panel. In the liquid crystal display device having the above-described structure, the width occupied by the shielding layer to shield the bottom plate from viewers viewing the device from the top (or front) can be reduced, thereby implementing a narrow bezel.

In fabricating a liquid crystal display device having the above-described structure, a process of disposing the liquid crystal display panel on the side walls of the bottom plate requires accurate alignment of the bottom plate with the liquid crystal display panel. Generally, the liquid crystal display panel is surrounded by the side walls of the bottom plate, and thus the liquid crystal display panel can be inserted into the bottom plate without aligning the two layers. However, in fabricating a liquid crystal display device where the liquid crystal display panel is disposed on the side walls of the bottom plate, an alignment process is necessary to accurately place the liquid crystal display panel at the desired location. If there is misalignment between the bottom plate and the liquid crystal display panel, the backlight unit is not in line with the liquid crystal display panel, and light leakage may occur from the backlight unit, thereby degrading the image quality.

In this regard, a method for disposing a liquid crystal display panel on the bottom plate has been proposed, in which an alignment hole is formed in the bottom plate, an alignment mark is formed on the liquid crystal display panel, and the bottom plate is aligned with the liquid crystal display panel such that the alignment mark is in line with the alignment hole.

However, the alignment mark and the alignment hole may be misaligned due to the material and structure of the bottom plate.

For example, the bottom plate may be made of a metallic material such as stainless steel (SUS). When the bottom plate is made of a metallic material, the light produced by the backlight unit is reflected off the bottom plate resulting in light leakage. To address this problem, a mold made of a plastic material may be disposed on the inner periphery of the bottom plate. Such a mold is made of a light-absorbing material and thus, can suppress light leakage. The alignment hole formed in the bottom plate may penetrate the mold.

On the other hand, irregularities (e.g. burrs) or uneven surface portions may be formed on the inner surface of the mold during the process of forming the alignment hole by penetrating the mold, because the mold is made of a plastic material, and the inner surface of the mold surrounding the alignment hole is not smooth. In addition, the shape of the inner surface of the mold surrounding the alignment hole may differ from that of another alignment hole.

As described above, the shape of the alignment hole is changed or blocked due to burrs or irregular surfaces inside the alignment hole, or the shape of the alignment hole is not uniform. As a result, the bottom plate and liquid-crystal display panel may be misaligned during the alignment process using the alignment hole and the alignment mark.

SUMMARY

In view of the above, an object of the present disclosure is to provide a liquid crystal display device capable of avoiding misalignment during the process of bonding a bottom plate to a liquid crystal display panel by forming alignment holes in the bottom plate accurately and uniformly.

An exemplary embodiment provides a display device comprising: a display unit having an alignment mark; and a bottom plate disposed under the first display unit and comprising an alignment hole corresponding to the alignment mark, wherein the bottom plate comprises: a base portion having a first area and a second area surrounding the first area, the alignment hole being located in the second area; a side wall portion along a periphery of the base portion; and a protruding portion protruding from the base portion to surround the alignment hole.

In another exemplary embodiment, the display device further comprises: a backlight unit in the first area; and a shielding member on the base portion of the second area surrounding the protruding portion.

In another exemplary embodiment, the shielding member is made of plastic containing a light-absorbing material.

In another exemplary embodiment, the shielding member comprises an adhesive material.

In another exemplary embodiment, the display device further comprises: further comprises an adhesive tape disposed on the side wall and the shielding member, wherein the display unit is bonded to the bottom plate by the adhesive tape.

In another exemplary embodiment, the protruding portion is received through the shielding member, and wherein the protruding portion is an insertion member defining the alignment hole.

In another exemplary embodiment, the protruding portion is made of stainless steel (SUS) or aluminum.

In another exemplary embodiment, the protruding portion has a circular column shape or a polygonal column shape.

In another exemplary embodiment, the protruding portion is integral with the base portion.

In another exemplary embodiment, the protruding portion and the side wall portion have the same height.

In another exemplary embodiment, the display panel of the display device comprises: a first substrate; a second substrate facing the first substrate; a liquid crystal layer interposed between the first substrate and the second substrate; a first polarizing plate under the first substrate; and a second polarizing plate on the second substrate, wherein the first polarizing plate is configured so as to overlap with a part of the first substrate, and the alignment mark is in an area of the first substrate adjacent to the part of the first substrate.

Another exemplary embodiment of the present disclosure provides a liquid crystal display (LCD) device comprising: a liquid crystal display panel; a backlight unit under the liquid crystal display panel; and a bottom plate accommodating the backlight unit, wherein the bottom plate includes a shielding member configured to suppress reflected light from the bottom plate, and an alignment hole configured to align the bottom plate with the liquid crystal display panel, and wherein the bottom plate has a protruding portion having the alignment hole formed therein.

In another exemplary embodiment, the protruding portion and the shielding member are made of different materials.

In another exemplary embodiment, the protruding portion and the bottom plate are made of the same material.

In another exemplary embodiment, protruding portion is made of a rigid material.

In another exemplary embodiment, wherein outer dimensions of the bottom plate is equal to or smaller than outer dimensions of the liquid crystal display panel.

Another exemplary embodiment of the present disclosure provides a display panel having at least one alignment mark; a metallic support structure having side walls that support said display panel; a light shield member at corresponding inner portions of said support structure; and one or more alignment posts, having respective alignment holes therethrough, located at respective portions of said support structure adjacent to the side walls thereof and received through respective portions at said light shield member, wherein said alignment posts and said at least one alignment mark facilitate attachment of said display panel to said support structure during the alignment process.

In another exemplary embodiment, the alignment posts are received through or formed as an integral extension of said respective portions of said support structure.

In another exemplary embodiment, the support structure further accommodates a backlight unit therein, wherein respective upper surfaces of said backlight unit, said alignment posts, said light shielding member, and said side walls are in contact with each other.

It should be noted that objects of the present disclosure are not limited to the above-described objects, and other objects of the present disclosure will be apparent to those skilled in the art from the following descriptions.

Particulars in the exemplary embodiments of the present disclosure will be described in the detail description with reference to the accompanying drawings, but the present disclosure is not limited thereto.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION OF THE PREFERRED EMBODIMENT

Figure 1:
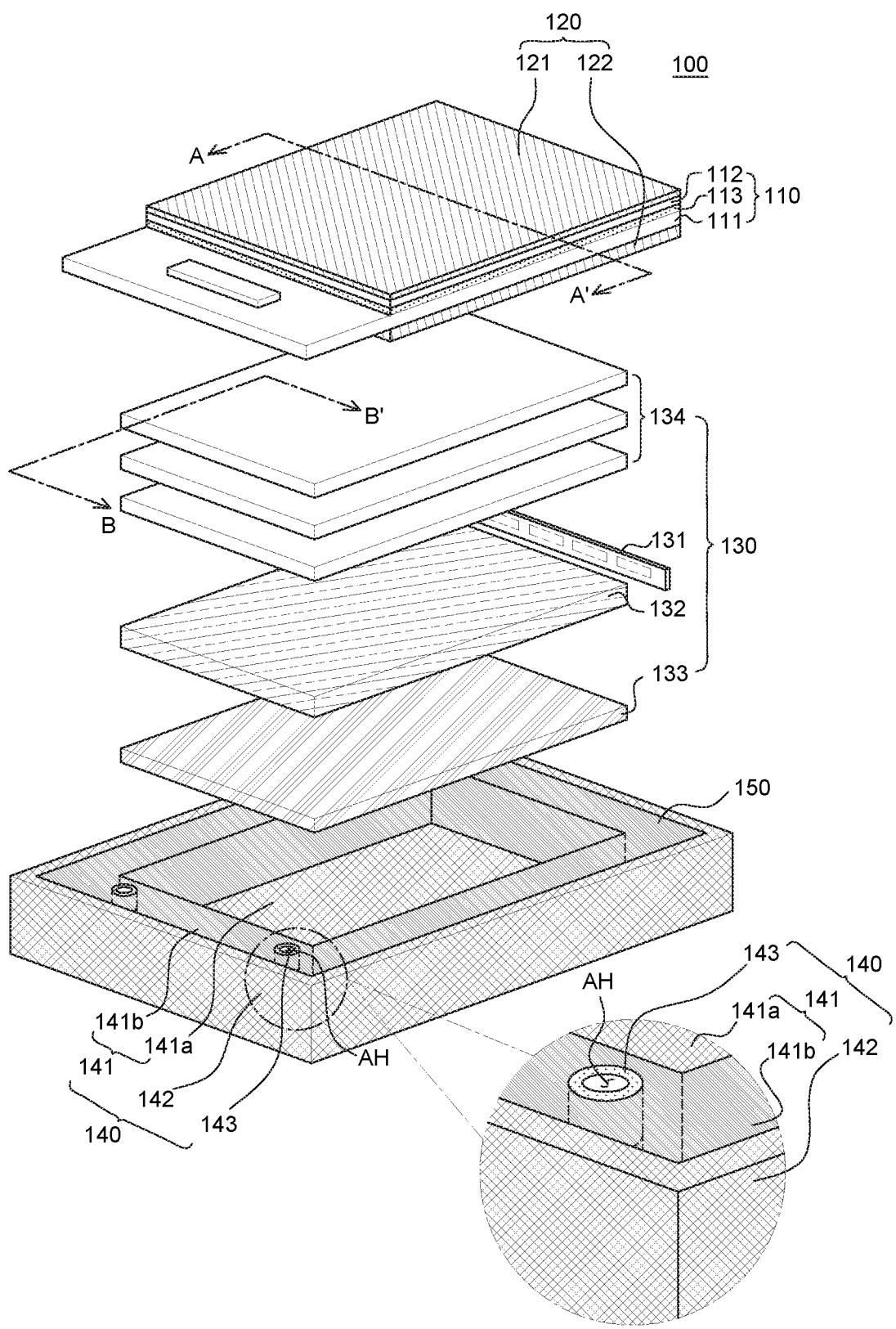
FIG. 1 is an exploded perspective view of a liquid crystal display device according to an exemplary embodiment of the present disclosure.

Advantages and features of the present disclosure and methods to achieve the same will become apparent from the exemplary embodiments described below with reference to the accompanying drawings. However, the present disclosure is not limited to the exemplary embodiments disclosed herein and may be implemented in various different ways. The exemplary embodiments are provided for completing the disclosure of the present disclosure and for fully conveying the scope of the present disclosure to those skilled in the art. The scope of the present disclosure can be defined by the appended claims, and combinations thereof.

The figures, dimensions, ratios, angles, the numbers of the elements in the drawings are merely illustrative and are not limiting. Like reference numerals denote like elements throughout the descriptions. Further, in describing the present disclosure, descriptions of well-known technologies may be omitted to avoid obscurity the gist of the present disclosure. The terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," also includes a plural of that noun unless specifically stated otherwise.

In describing elements, error margins are considered as being included wherein the values thereof even without any explicit statements to this effect.

In describing positional relationships, such as "an element A on an element B," "an element A above an element B," "an element A below an element B," and "an element A next to an element B," one or more additional elements may be disposed between the elements A and B unless the term "directly" or "immediately" is explicitly used.

As used herein, a phrase "an element A on an element B" refers to the element A being disposed directly on the element B and/or one or more additional elements being disposed between the elements A and B.

The terms first, second and the like in the descriptions and in the claims are used for distinguishing between similar elements and not necessarily for describing a sequential or chronological order. Accordingly, as used herein, a first element may be a second element within the technical idea of the present disclosure.

The relative dimensions of various elements in the drawings are depicted schematically and not necessarily to scale.

Features of various exemplary embodiments of the present disclosure may be combined partially or totally. As will be clearly appreciated by those skilled in the art, various interactions and operations are possible, and various exemplary embodiments can be practiced individually or in combination.

Hereinafter, exemplary embodiments of the present disclosure will be described in detail with reference to the accompanying drawings.

Figure 2:
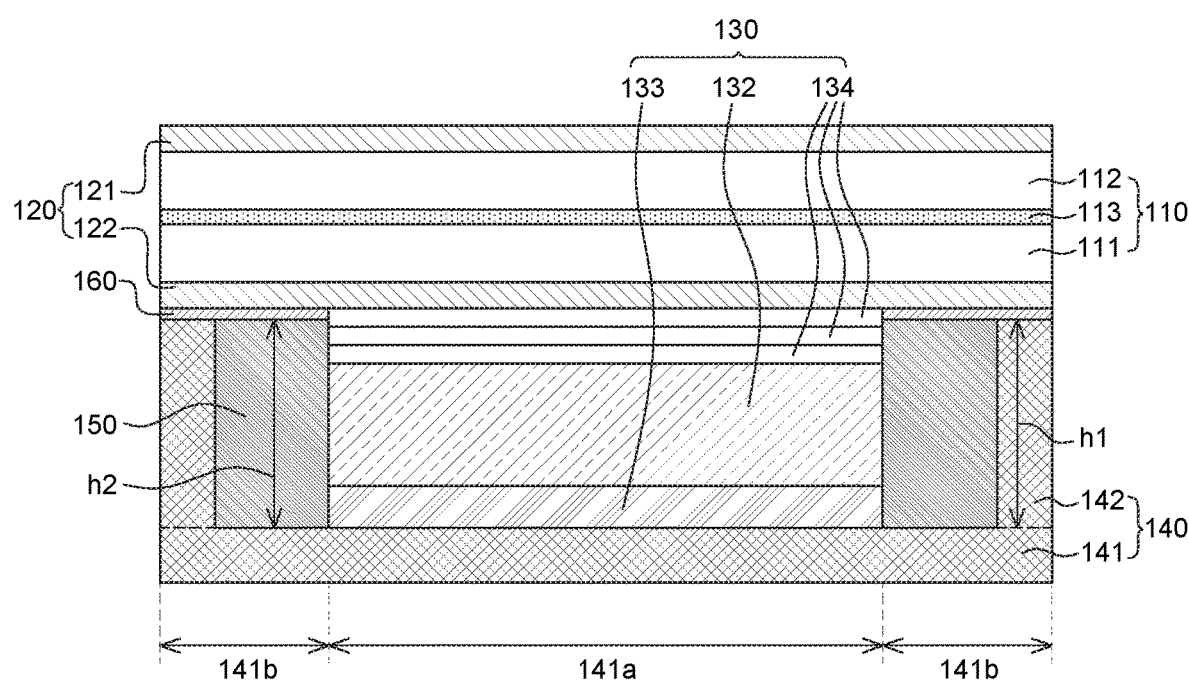
FIG. 2 is a cross-sectional view along line A-A' of the liquid crystal display illustrated in FIG. 1.

FIG. 1 is an exploded perspective view of a liquid crystal display device according to an exemplary embodiment of the present disclosure, and FIG. 2 is a cross-sectional view along line A-A' of FIG. 1. As illustrated in FIGS. 1 and 2, a liquid crystal display device 100 includes a liquid crystal display panel 110, a polarizing plate 120, a backlight unit 130, a bottom plate 140 (or similar support structure), a shielding member 150 (or similar element), and an adhesive tape 160. The adhesive tape 160 is not shown in FIG. 1 for convenience of illustration.

The liquid crystal display panel 110 includes a first substrate 111, a second substrate 112 facing the first substrate 111, and a liquid crystal layer 113 interposed between the first substrate 111 and the second substrate 112. The liquid crystal display panel 110 displays images by adjusting the transmittance of light produced by the backlight unit 130. Alignment marks are formed on the liquid crystal display panel 110 for aligning with the bottom plate 140 during the manufacturing process. Specifically, the alignment marks are formed on the first substrate 111. The area of the first substrate 111 where the alignment marks are formed may be a non-display area where no image is displayed. The alignment marks will be described in more detail below with reference to FIG. 4.

The polarizing plate 120 includes an upper polarizing plate 121 disposed on the second substrate 112, and a lower polarizing plate 122 disposed under the first substrate 111. The lower polarizing plate 122 polarizes light produced by the backlight unit 130 before the light passes through to the first substrate 111. The upper polarizing plate 121 polarizes the light transmitted through the second substrate 112 to allow the light to be emitted from the device. The lower polarizing plate 122 may not be disposed throughout the entire lower surface of the first substrate 111, and may be disposed only on a part thereof.

The backlight unit 130 provides light to the liquid crystal display panel 110 to allow images to be displayed. The backlight unit 130 includes a light source unit 131, a light guide plate 132, a reflective plate 133, and a plurality of optical sheets 134.

The light source unit 131 generates light and sends the generated light to the light guide plate 132. The light source unit 131 is disposed to face a side surface of the light guide plate 132. Although FIG. 1 shows an edge-type backlight in which the light source unit 131 disposed at a side surface of the light guide plate 132, this is merely illustrative, and the disclosure is not limited thereto. For example, the light source unit 131 may be a bottom (or direct) type backlight in which the light source unit 131 is disposed under the light guide plate 132, i.e. the light source unit 131 may have a structure in which a plurality of light sources are disposed on a circuit board or substrate. The plurality of light sources may be one of light emission diodes (LEDs), cold cathode fluorescent lamps (CCFLs), external electrode fluorescent lamps (EEFLs), other type of light emissive elements, or any combination thereof.

The light guide plate 132 can be disposed in substantially the same plane with the light source unit 131. The light guide plate 132 guides the light from the light source unit 131 to the liquid crystal display panel 110. The light guide plate 132 is made of a transparent material, a variety of materials that can guide light, a rigid material or a flexible material. For example, the light guide plate 132 may be made of, but is not limited to, polymethyl-methacrylate (PMMA). The light guide plate 132 may have a plate-like shape, as illustrated in FIG. 1 or may have a wedge-like shape, but the shapes are not limited thereto.

The reflective plate 133 is disposed under the light guide plate 132. The reflective plate 133 redirects the path of the light emitted from the light source unit 131 to proceed toward the bottom of the light guide plate 132. The reflective plate 133 may be made of a reflective material, e.g., metal.

The plurality of optical sheets 134 may be disposed above the light guide plate 132. The plurality of optical sheets 134 enhances the characteristics of the light generated from the light source unit 131. The plurality of optical sheets 134 may include a diffusion sheet, a prism sheet, and a protection sheet.

The bottom plate 140 (or support structure) can have a rectangular box-like shape with side walls and an open top as shown in FIG. 1, and accommodates the backlight unit 130. The bottom plate 140 may be made of a metallic or non-metallic material having rigidity. For example, the bottom plate 140 may be made of a metallic material such as aluminum, iron, stainless steel or an alloy thereof.

The bottom plate 140 includes a base portion 141 on which the backlight unit 130 is disposed, and side wall portions 142 extending from the base portion 141 and disposed along the periphery of the base portion 141. The base portion 141 and the side wall portions 142 may be perpendicular to each other. However, this is merely illustrative, and the structure is not limited thereto. The angle base portion 141 and the side wall portions 142 of the bottom plate 140 may vary.

The base portion 141 can include a first area 141a, and a second area 141b surrounding the first area 141a. The first area 141a may correspond to the display area of the liquid crystal display panel 110 in which images are displayed. The second area 141b may correspond to the non-display area of the liquid crystal display panel 110 in which no image is displayed. However, this is merely illustrative, and the structure is not limited thereto.

The backlight unit 130 is disposed in the first area 141a. In addition, protruding portions 143 (i.e. alignment posts, columns or other similar structures) each having an alignment hole AH and a shielding member 150 (i.e. light blockers, elements or other similar structures) are disposed in the second area 141b. The protruding portion 143 of the bottom plate 140 can be formed by inserting an additional insertion member having an alignment hole AH into the bottom plate 140 or by inserting it into both of the bottom plate 140 and the shielding member 150. This will be described in detail below with reference to FIGS. 3 to 5.

The shielding member 150 is disposed in the second area 141b of the base portion 141 and between the side wall portions 142 and the backlight unit 130, as illustrated in FIG. 2. In addition, the shielding member 150 is disposed such that it comes in contact with the side wall portion 142 in the second area 141b.

The height of the shielding member 150 may be equal to that of the side wall portions 142 of the bottom plate 140. As used herein, the height h1 of the side wall portion 142 is measured from the upper surface of the base portion 141. As the height h2 of the shielding member 150 may be equal to the height h1 of the side wall portion 142, the adhesive tape 160 may be easily disposed between the bottom plate 140 and the liquid crystal display panel 120.

The shielding member 150 (i.e. in the form of one or more layers, surface coating(s) or treatments, attachable elements, etc.) may be made of a plastic containing a light-absorbing material. For example, the shielding member 150 may be made of a plastic containing carbon black. As the shielding member 150 include a light-absorbing material, light leakage, which is caused when light from the backlight unit 130 is undesirably reflected off the side wall portions 142 of the bottom plate 140 (due to the bottom plate 140 being made of metal that reflects light), can be effectively suppressed.

As illustrated in FIG. 2, the size of the bottom plate 140 may be equal to that of the liquid crystal display panel 110. Specifically, the area of a surface of the bottom plate 140, e.g., the upper surface of the bottom plate 140 may be equal to the area of a surface of the liquid crystal display panel 110, e.g., the lower surface of the liquid crystal display panel 110. Accordingly, the liquid crystal display panel 110 is not accommodated directly on the bottom plate 140 itself, but is supported by the side wall portions 142 of the bottom plate 140, and the bottom plate 140 is not seen when viewed from the top of the liquid crystal display panel 110. Although the size of the bottom plate 140 is shown to be equal to that of the liquid crystal display panel 110 in FIG. 2, this is merely illustrative. For example, the size of the bottom plate 140 may be smaller than that of the liquid crystal display panel 110.

The adhesive tape 160 (or equivalent attachment means) is disposed between the liquid crystal display panel 110, where the polarizing plate 120 is disposed, and the bottom plate 140, where the backlight unit 130 is accommodated. The adhesive tape 160 is a two-sided tape and is disposed on the side wall portions 142 of the bottom plate 140 and on the shield member 150 to provide a secure bond between the liquid crystal display panel 110 and the backlight unit 130, but the adhesive tape 160 is not limited to being disposed on the side wall portions 142 of the bottom plate 140 and the shielding member 150. For example, the adhesive tape 160 may be disposed only on the side wall portions 142, if desired.

Hereinafter, the structure of the liquid crystal display device 100 will be described in more detail with reference to FIGS. 3 to 5.

Figure 3:
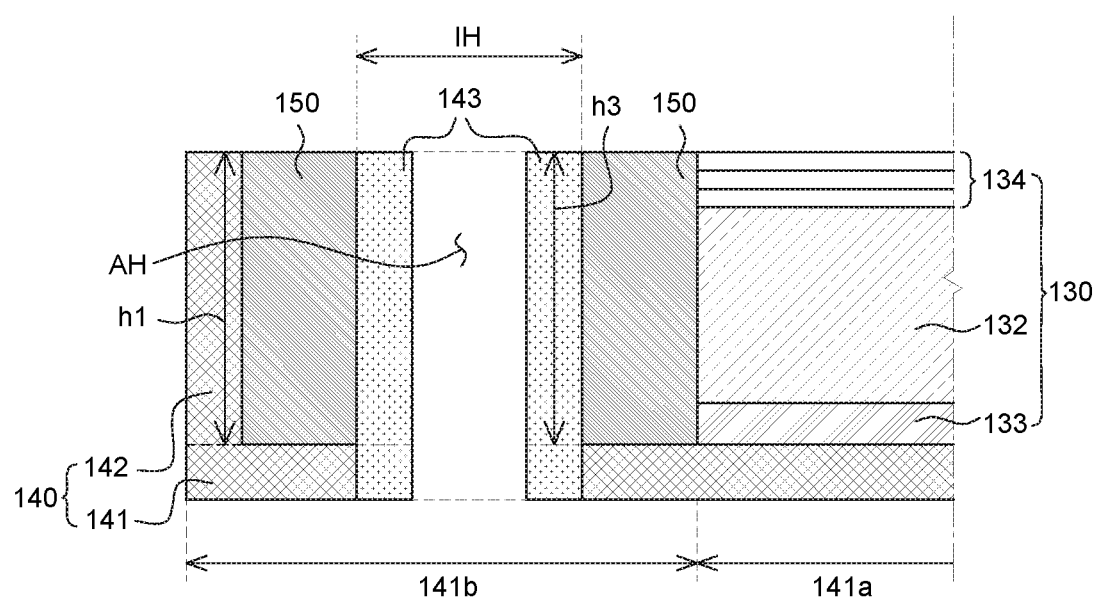
FIG. 3 is a cross-sectional view along line B-B' of the liquid crystal display illustrated in FIG. 1.

FIG. 3 is a cross-sectional view of the liquid crystal display device 100 along line B-B' of FIG. 1, and illustrates the bottom plate 140 (or support structure), the shielding member 150 (or light blocker) and the backlight unit 130 only among the elements of the liquid crystal display device 100 for convenience of illustration. FIG. 4 is a plan view illustrating the alignment marks of the liquid crystal display device 100, and is a view of the polarizing plate 122 when viewed from the bottom. FIG. 5 is a plan view illustrating the alignment holes of the liquid crystal display device 100, and is a view of the bottom plate 140 when viewed from the bottom.

Figure 4:
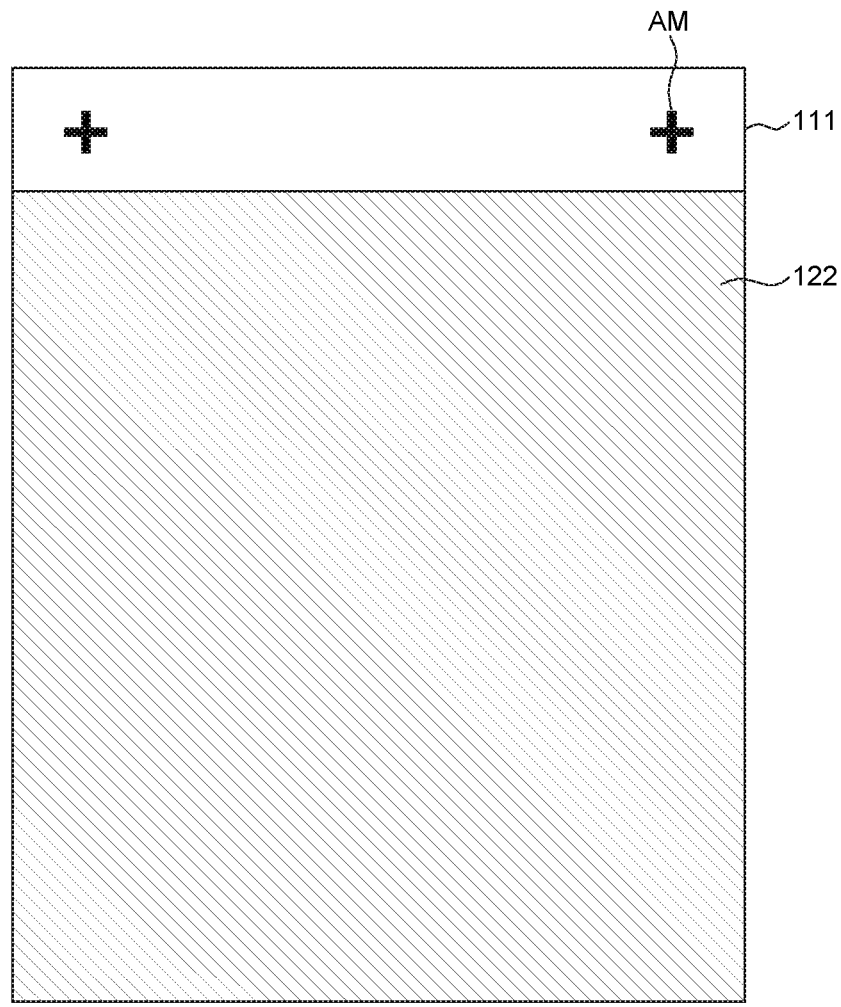
FIG. 4 is a plan view illustrating the position of the alignment marks of a liquid crystal display device according to an exemplary embodiment of the present disclosure.
Figure 5:
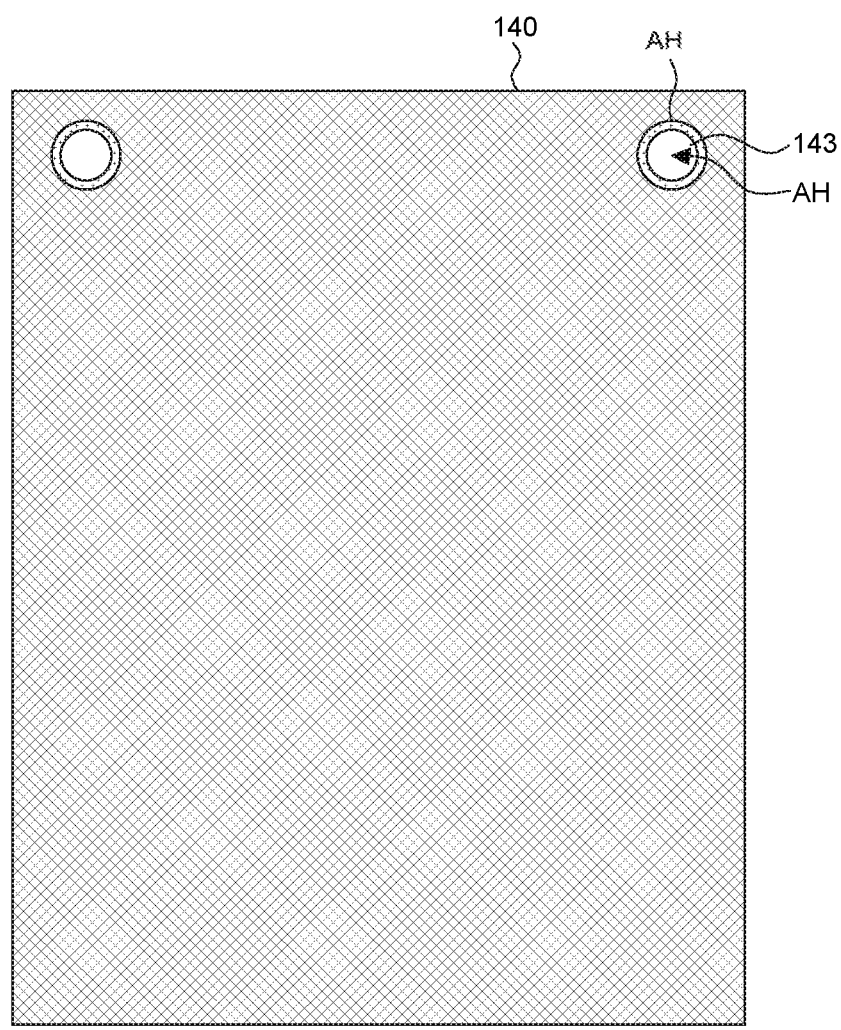
FIG. 5 is a plan view illustrating the position of the alignment holes of a liquid crystal display device according to an exemplary embodiment of the present disclosure.

Referring to FIGS. 3 to 5, the protruding portion 143 (or alignment post, column, guide, etc.) of the bottom plate 140 can be formed by inserting an additional insertion member into an insertion hole (IH) of the bottom plate. In other words, the protruding portion 143 may or may not be an integral part of the base portion 141 or the side wall portions 142. The height h3 of the protruding portion 143 may be equal to the height h1 of the side wall portion 142 from the base 141 portion of the bottom plate 140, as illustrated in FIG. 3.

The insertion holes (IH) can be formed at or near the respective corners of the second area 141b of the base portion 141. The insertion holes IH may be disposed such that they can be used in alignment with the respective alignment marks formed on the liquid crystal display panel 110. As illustrated in FIG. 3, the diameter of the insertion holes IH is larger than that of the alignment holes AH.

As described above, the shielding member 150 surrounds the protruding portion 143, and the shielding member 150 may further include an adhesive material in addition to a plastic containing a light-absorbing material. Accordingly, the protruding portion 143 inserted into the insertion hole IH comes in contact with the shielding member 150, and is fixed to the hole by the adhesive material of the shielding member 150.

The protruding portion 143 may be made of a rigid material, e.g., stainless steel or aluminum. For example, the protruding portion 143 may be made of the same material as that of the base 141 and the side wall portion 142.

The protruding portion 143 has a hollow center. That is, the protruding portion 143 has the alignment hole AH of its center. Accordingly, in the liquid crystal display device 100, the protruding portion 143 made of a rigid material is inserted into the insertion hole IH to form the alignment hole AH, such that deformation of the alignment hole AH during the process of fabricating the liquid crystal display device 100 can be suppressed. Further, protruding portions 143 having a uniform shape are used in the process of forming the alignment holes AH, and thus the alignment holes AH can be formed uniformly. In this manner, it is possible to suppress the possibility of misalignment of the liquid crystal display panel 110 and the bottom plate 140 during the bonding process.

The protruding portions 143 may have a variety of different shapes, which will be described in more detail with respect to FIGS. 6A to 6D.

FIGS. 6A to 6D are perspective views of a variety of shapes of the protruding portions which can be employed by the liquid crystal display device according to an exemplary embodiment of the present disclosure. Referring to FIGS. 6A to 6D, the protruding portions 143, which can be a separate element from the base portion 141 and the side wall portion 142 illustrated in FIG. 3, may have a variety of shapes.

Figure 6A:
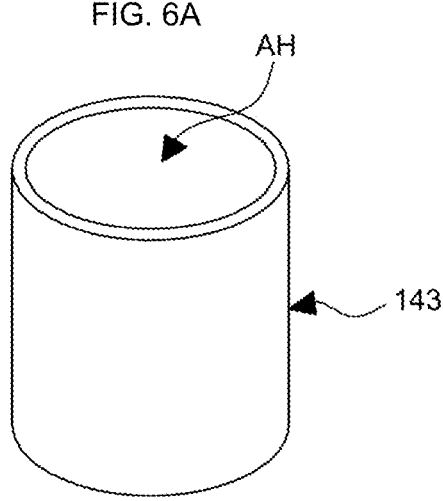
FIGS. 6A to 6D are perspective views of a variety of shapes of a protruding portion which can be employed by a liquid crystal display device according to an exemplary embodiment of the present disclosure.
Figure 6B:
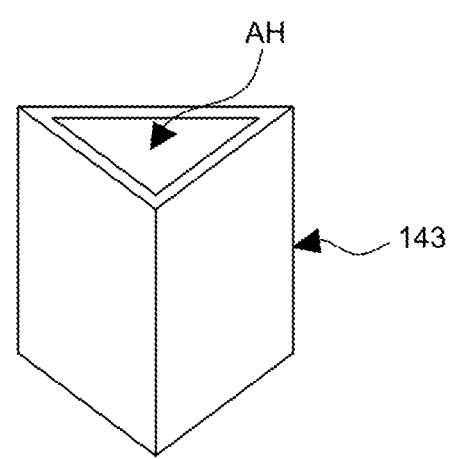
Figure 6C:
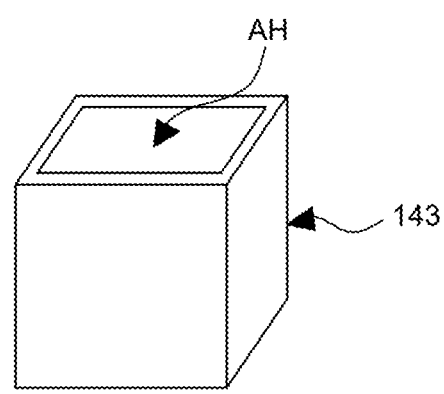
Figure 6D:
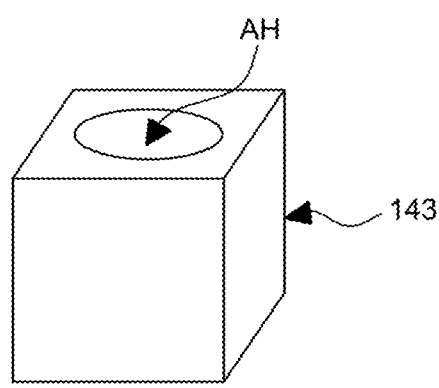

The protruding portions 143 may have a circular column shape, as illustrated in FIG. 6A, a triangular column shape as illustrated in FIG. 6B, or rectangular column shapes, as illustrated in FIGS. 6C and 6D, but the protruding portion 143 are not limited to these shapes. For example, the protruding portions 143 may have other polygonal column shapes, such as octagonal or hexagonal column shapes.

The alignment hole AH formed in the center of the protruding portions 143 may have the same outer shape as that of the protruding portions 143. For example, the alignment hole AH may have a circular column shape like the protruding portion 143, as illustrated in FIG. 6A, may have a triangular column shape like the protruding portion 143, as illustrated in FIG. 6B, or may have a rectangular column shapes like the protruding portion 143, as illustrated in FIG. 6C.

However, it is to be noted that the shape of the protruding portions 143 may differ from that of the alignment hole AH. For example, as illustrated in FIG. 6D, the protruding portions 143 may have a rectangular column shape while the alignment hole AH may have a circular column shape.

Referring back to FIGS. 3 to 5, the alignment holes AH are disposed such that they are in line with the respective alignment marks AM formed in the first substrate 111. The size of the alignment holes AH may be equal to or larger than that of the alignment marks AM. In the liquid crystal display device 100, the liquid crystal display panel 110 and the bottom plate 140 are aligned by using an automated aligning apparatus or equipment so that the alignment holes AH are in line with and the respective alignment marks AM.

The alignment marks AM are formed in a part of the first substrate 111 adjacent to the part of the first substrate 111 where the lower polarizing plate 122 is disposed. In other words, the alignment mark AM may be in a part of the non-display area of the first substrate 111. For example, the alignment mark AM may be formed by printing a black ink on the first substrate 111. Alternatively, the alignment mark AM may be made of a metal material that is used for forming metal lines or conductive traces on the first substrate 111.

In the liquid crystal display device 100, a process of forming the alignment holes AH, i.e., a process of forming the protruding portions 143, may be as follows.

The shielding member 150 is disposed or formed in the second area 141b of the base 141 of the bottom plate 140, and then the insertion hole IH is formed to penetrate a part of the second area 141b of the base portion 141 and the shielding member 150. Subsequently, the protruding portion 143 having the alignment hole AH is inserted into the insertion hole IH, such that the alignment hole AH having a uniform shape is disposed.

Alternatively, the insertion hole IH is formed only in a part of the second area 141b of the base portion 141 of the bottom plate 140, and then an additional protruding portion 143 having an alignment hole AH may be inserted into the insertion hole IH, thereby disposing the protruding portion 143. Subsequently, the shielding member 150 is formed or placed in the second area 141b of the base portion 141 where the protruding portion 143 is disposed by injection molding. As described above, if the shielding member 150 contains an adhesive material, the base portion 141 may be fixed to the protruding portion 143 by the shielding member without any additional adhesive means.

In the existing liquid crystal display device, an alignment hole is formed by penetrating the base of the bottom plate and the shielding member, and burr or the like is generated in the shielding member due to the material of the shield member, such that misalignment between the liquid crystal display panel and the bottom plate occurs inevitably.

In contrast, in the liquid crystal display device 100 according to the exemplary embodiment of the present disclosure, the insertion hole IH larger than the existing alignment hole is formed by penetrating the base portion 141 of the bottom plate 140 and the shielding member 150, and a separate insertion member made of a rigid material and having the alignment hole AH defined therein is inserted into the insertion hole IH, thereby disposing the protruding portion 143. As a result, it is possible to avoid deformation of the alignment hole AH. In this manner, it is possible to suppress misalignment between the liquid crystal display panel 110 and the bottom plate 140.

In addition, in the liquid crystal display device 100 according to an exemplary embodiment of the present disclosure, the shielding member 150 is disposed such that it comes in contact with the side wall portion 142 in the second area 141b of the base portion 141 of the bottom plate 140, such that it is possible to suppress the light produced by the backlight unit 130 from leaking.

Further, in the liquid crystal display device 100 according to an exemplary embodiment of the present disclosure, the shielding member 150 contains an adhesive material and surrounds the protruding portion 143, such that the protruding portion 143 can be fixed without any additional fixing member.

In addition, in the liquid crystal display device 100 according to an exemplary embodiment of the present disclosure, the area of a surface of the bottom plate 140 is equal to or smaller than the area of a surface of the liquid crystal display panel 110, and the bottom plate 140 is bonded to the liquid crystal display panel 110, thereby implementing a narrow bezel.

Figure 7:
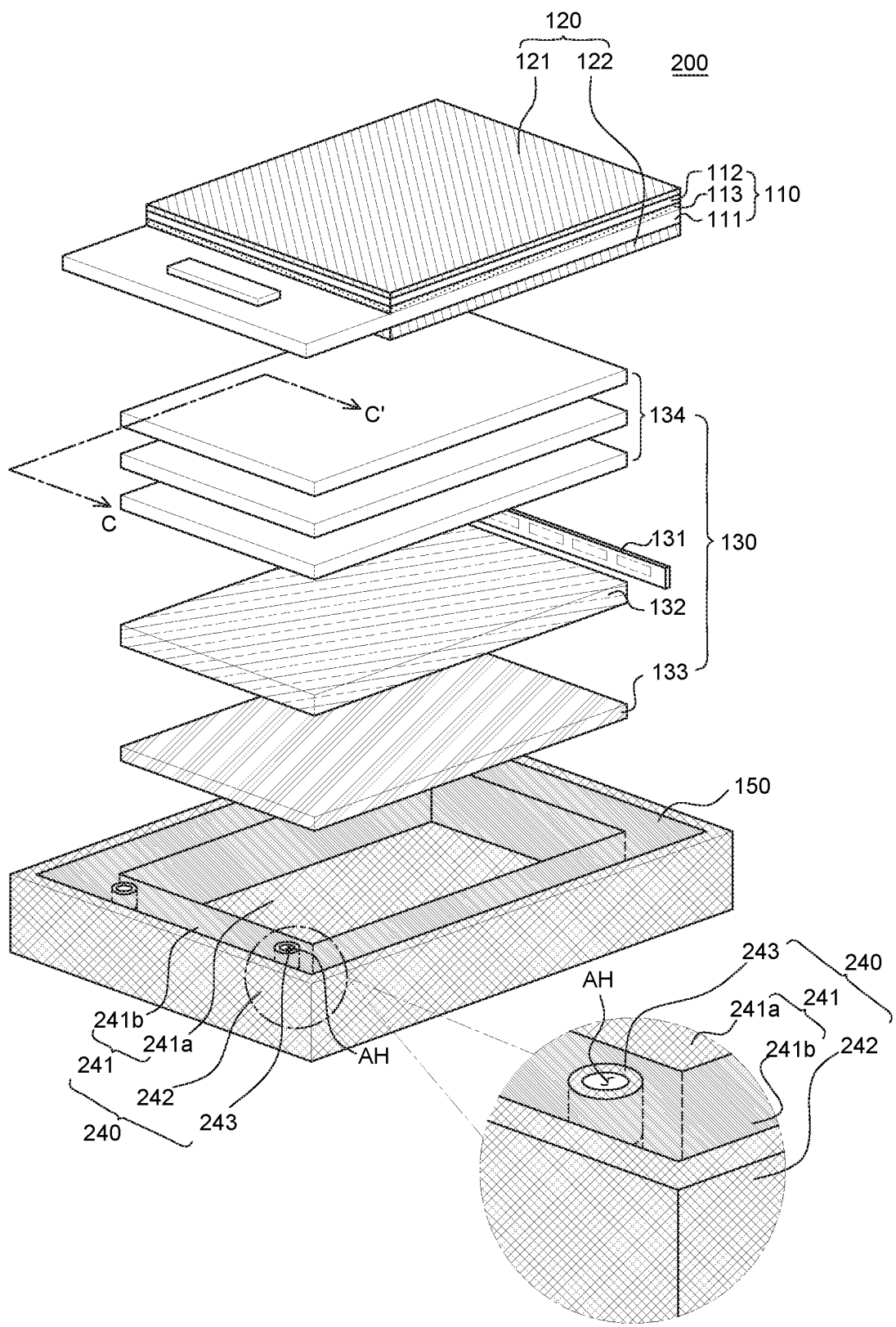
FIG. 7 is an exploded perspective view of a liquid crystal display device according to another exemplary embodiment of the present disclosure.
Figure 8:
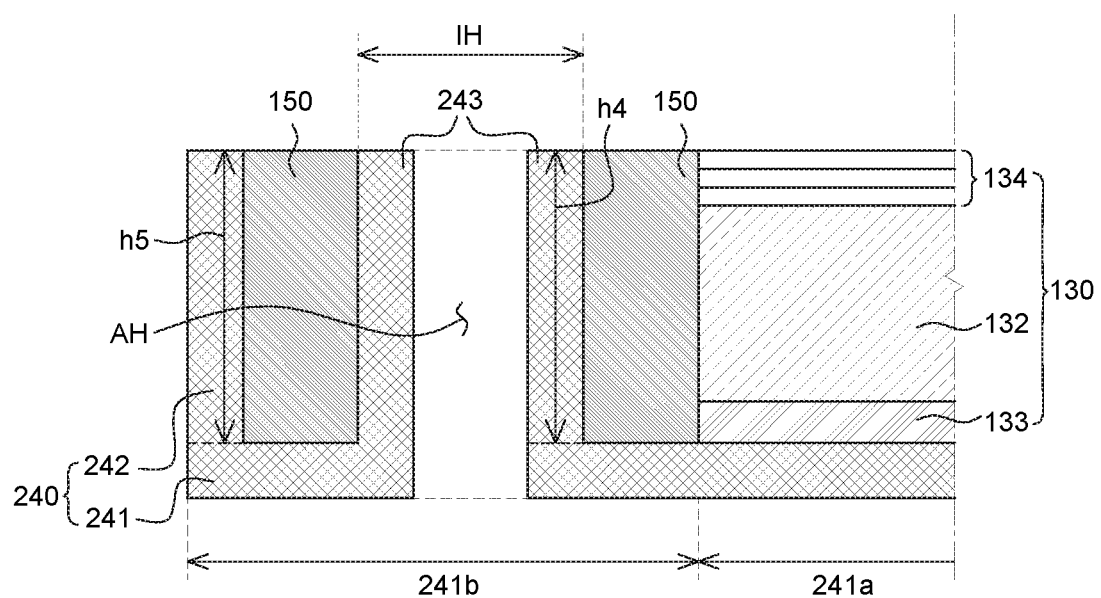
FIG. 8 is a cross-sectional view of the liquid crystal display device, taken along line C-C' of the liquid crystal display device illustrated in FIG. 7.

FIG. 7 is a cross-sectional view illustrating a liquid crystal display device according to another exemplary embodiment of the present disclosure, and FIG. 8 is a cross-sectional view along line C-C' of the display device illustrated in FIG. 7. The liquid crystal display device 200 illustrated in FIGS. 7 and 8 is substantially identical to the liquid crystal display device 100 shown in FIGS. 1 to 6D, except for the shape of a protruding portion 243 of a bottom plate 240. Therefore, redundant descriptions thereof will be omitted.

As illustrated in FIGS. 7 and 8, the protruding portion 243 and the bottom plate 240 are configured as a single piece. The protruding portion 243 protrudes upwards from a base portion 241 of the bottom plate 240. In addition, the height h4 of the protruding portion 243 is equal to the height h5 of side wall portion 242 of the bottom plate 240 from the base 241, when measured from an upper surface of the base portion 241. An alignment hole AH is formed in the center of the protruding portion 243. The alignment hole AH has the same size as the alignment mark AM of the liquid crystal display panel 110, and is positioned in line with it.

In the liquid crystal display device 200, the protruding portion 243 is a part of the bottom plate 240, and thus does not require any additional insertion member. As a result, the process of fabricating the liquid crystal display device 200 is simpler. In addition, in the liquid crystal display device 200, the protruding portion 243 is a part of the bottom plate 240, and is made of a rigid material. Thus, it is possible to prevent deformation of the alignment hole AH.

Exemplary embodiments of the present disclosure have been described in detail with reference to the accompanying drawings. However, the present disclosure is not limited to the exemplary embodiments, and modifications and variations can be made thereto without departing from the technical idea of the present disclosure. Accordingly, the exemplary embodiments described herein are merely illustrative and are not intended to limit the scope of the present disclosure. The scope of protection sought by the present disclosure is defined solely by any appended claims and combinations thereof, and all equivalents thereof are construed to be within the true scope of the present disclosure.

What is claimed is:

1. A display device comprising:
   a display unit having an alignment mark;
   a backlight unit under the display unit and including a reflective plate, a light guide plate and a plurality of optical sheets; and
   a bottom plate under the backlight unit and comprising an alignment hole corresponding to the alignment mark,
   wherein the bottom plate comprises:
   a base portion having a first area and a second area surrounding the first area, the alignment hole being located in the second area;
   side wall portions extending from a periphery of the base portion;
   a protruding portion protruding from the base portion to surround the alignment hole; and
   a shielding member on the base portion of the second area surrounding the protruding portion,
   wherein the reflective plate, the light guide plate and the plurality of optical sheets are sequentially stacked on the base portion corresponding to the first area,
   wherein the side wall portions are perpendicularly disposed on the base portion,
   wherein the protruding portion is parallel to the side wall portions, and
   wherein the shielding member is in contact with side wall portions, sides of the reflective plate, the light guide plate and the plurality of optical sheets and an upper surface of the base portion.

2. The display device of claim 1, wherein the shielding member is made of plastic containing a light-absorbing material.

3. The display device of claim 1, wherein the shielding member comprises an adhesive material.

4. The display device of claim 1, further comprising:
   an adhesive tape on the side wall portions and the shielding member,
   wherein the display unit is bonded to the bottom plate by the adhesive tape.

5. The display device of claim 1, wherein the protruding portion is received through the shielding member, and wherein the protruding portion is an insertion member defining the alignment hole.

6. The display device of claim 1, wherein the protruding portion has a circular column shape or a polygonal column shape.

7. The display device of claim 1, wherein the protruding portion is integral with the base portion.

8. The display device of claim 1, wherein the protruding portion and the side wall portion have the same height.

9. The display device of claim 1, wherein the display panel comprises:
   a first substrate;
   a second substrate facing the first substrate;
   a liquid crystal layer between the first substrate and the second substrate;
   a first polarizing plate under the first substrate; and
   a second polarizing plate on the second substrate,
   wherein the first polarizing plate is configured so as to overlap with a part of the first substrate, and the alignment mark is in an area of the first substrate adjacent to the part of the first substrate.

10. A liquid crystal display (LCD) device comprising:
    a liquid crystal display panel;
    a backlight unit under the liquid crystal display panel and including a reflective plate, a light guide plate and a plurality of optical sheets; and
    a bottom plate accommodating the backlight unit,
    wherein the bottom plate includes a shielding member and an alignment hole, and
    wherein the bottom plate has a protruding portion having the alignment hole formed therein,
    wherein the bottom plate includes a base portion having a first area and a second area surrounding the first area and side wall portions extending from a periphery of the base portion,
    wherein the reflective plate, the light guide plate and the plurality of optical sheets are sequentially stacked on the base portion corresponding to the first area,
    wherein the side wall portions are perpendicularly disposed on the base portion in the second area,
    wherein the protruding portion is parallel to the side wall portions in the second area,
    wherein the shielding member is disposed on the base portion surrounding the reflective plate, the light guide plate and the plurality of optical sheets, and
    wherein the shielding member is in contact with side wall portions, sides of the reflective plate, the light guide plate and the plurality of optical sheets and an upper surface of the base portion.

11. The liquid crystal display device of claim 10, wherein the protruding portion and the shielding member are made of different materials.

12. The liquid crystal display device of claim 11, wherein the protruding portion and the bottom plate are made of the same material.

13. The liquid crystal display device of claim 10, wherein the shielding member is made of plastic comprising a light-absorbing material.

14. The liquid crystal display device of claim 10, wherein outer dimensions of the bottom plate is equal to or smaller than outer dimensions of the liquid crystal display panel.

15. An apparatus comprising:
    a display panel having at least one alignment mark;
    a backlight unit under the display panel and including a reflective plate, a light guide plate and a plurality of optical sheets;
    a metallic support structure including a base portion having a first area and a second area surrounding the first area and side walls that support said display panel and the backlight unit;
    a light shield member at corresponding inner portions of said support structure; and one or more alignment posts, having respective alignment holes therethrough, located at respective portions of said support structure adjacent to the side walls thereof and received through respective portions at said light shield member, wherein the reflective plate, the light guide plate and the plurality of optical sheets are sequentially stacked on the base portion corresponding to the first area, wherein said alignment posts and said at least one alignment mark facilitate attachment of said display panel to said support structure during the alignment process, wherein the side walls are extended from a periphery of the base portion, wherein the side walls are perpendicularly disposed on the base portion, wherein the alignment posts are parallel to the side walls, wherein the light shield member surrounds the reflective plate, the light guide plate and the plurality of optical sheets of the backlight unit, and wherein the light shield member is in contact with the side walls, sides of the reflective plate, the light guide plate and the plurality of optical sheets and an upper surface of the base portion.

16. The apparatus of claim 15, wherein said alignment posts are received through or formed as an integral extension of said respective portions of said support structure.

17. The apparatus of claim 16, wherein respective upper surfaces of said backlight unit, said alignment posts, said light shield member, and said side walls of said support structure are in contact with each other.

18. The display device of claim 1, further comprising an insertion hole penetrating the base portion and the shielding member.

19. The display device of claim 18, wherein the protruding portion is inserted into the insertion hole.

* * * * *